Patented Nov. 3, 1936

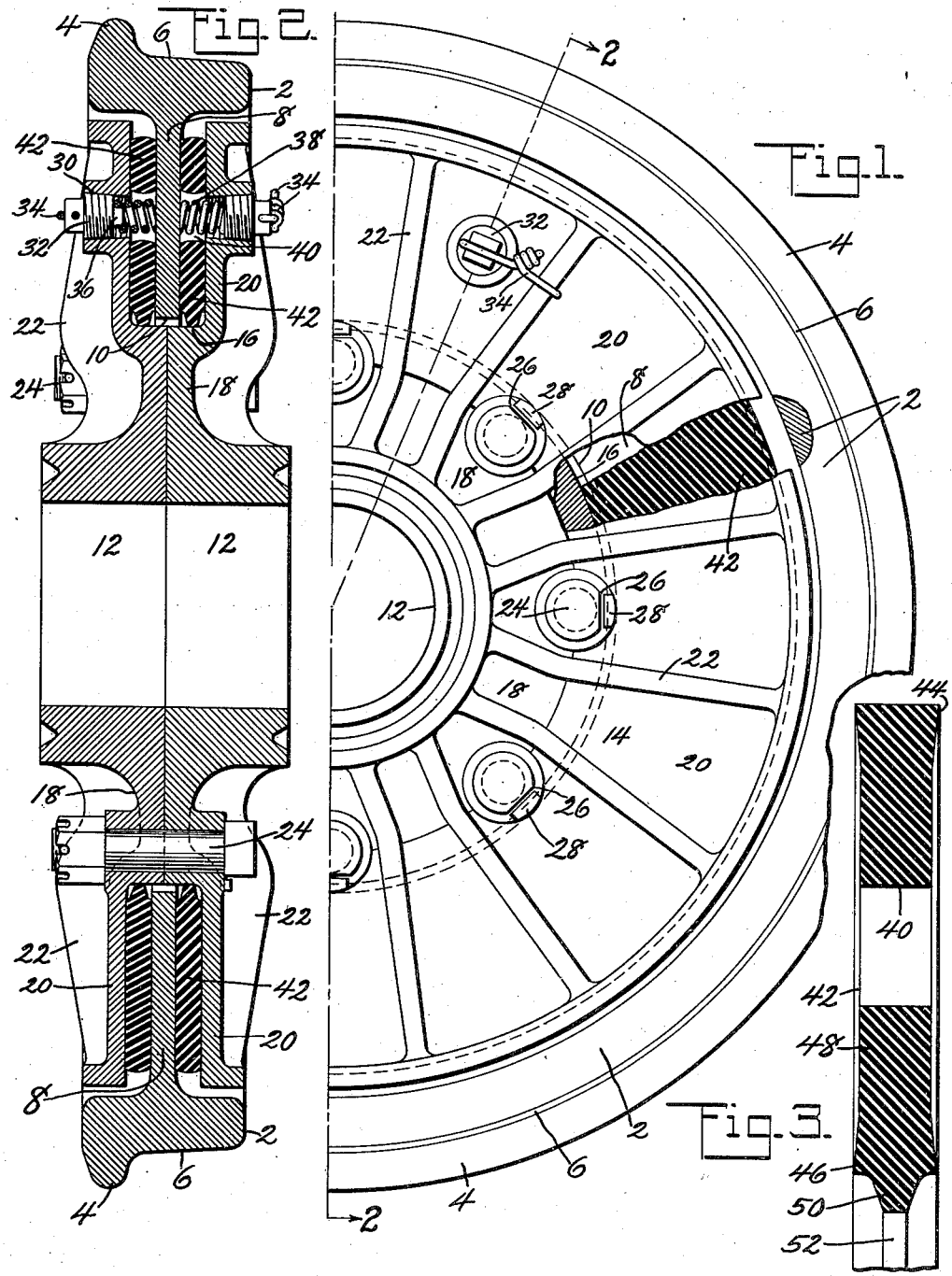

2,059,256

UNITED STATES PATENT OFFICE 2,059,256

CAR WHEEL

Elmer Latshaw, Philadelphia, Pa., assignor to J. G. Brill Company, Philadelphia, Pa., a corporation of Pennsylvania Application July 11, 1935, Serial No. 30,801

2 Claims. (Cl. 295—11)

The present invention relates to car wheels in general and in particular to railway car wheels in which the tread portion is movably coupled to the hub portion.

It is an object of the invention to provide a wheel in which disks of resilient material are interposed between the tread and hub portions and act in shear to absorb vibration.

It is another object of the invention to provide a wheel having a tread portion resiliently coupled to the hub and equipped with fully protected, yet readily removable current shunts.

It is another object of the invention to provide a wheel having a resilient disk so formed as to give substantially uniform compression over the entire area when clamped by the wheel parts.

These and other objects will be apparent to one skilled in the art from a study of the following description when taken in conjunction with the accompanying drawing in which:

Figure 1 is an elevational view of half a car wheel, parts being broken away to more fully show the relation of the wheel elements;

Fig. 2 is a sectional view taken on line 2—2 of Fig. 1; and

Fig. 3 is a sectional view of the portion of the special resilient disk.

Referring now to the drawing it is seen that the wheel is formed with a tire portion 2 having the usual flange 4 and tread portion 6 which is reenforced by web portion 8 extending inwardly from the tire portion substantially in alignment with the center of pressure of the tire when in use. The web portion terminates at 10, thus leaving a large central opening or bore in what would otherwise be a solid disk wheel.

The central or hub portion of the wheel is formed by two identical halves, each of which is formed with a central opening 12 adapted to have a press fit on the car axle and with a radially extending plate 14 having an offset 16 therein, thereby forming offset plate portions 18 and 20. The inner plate portions 18 are adapted to have abutting relation when assembled, while the outer plate portions 20 will be spaced a suitable predetermined amount to receive the resilient material and web of the tire. Radially extending bracing ribs 22 are arranged in pairs to suitably brace the plate portions, and are so spaced as to permit passage of bolts 24 through suitable holes formed in the plate portion 18. The bolt heads may be provided with a plane portion 26 adapted to engage a lug 28 on the inner plate portion, thereby preventing turning of the bolt.

In order to provide positive electrical connection between the tire and hub portion for the collection of current for motors or for the operation of signal devices the outer plate is provided with tapped openings 30 adapted to receive a plug 32 which may be suitably locked in place as by wire 34 or other means. Each plug is provided with a spring seat 36 to receive a suitable spring 38 of phosphor bronze or other material which extends through small holes or openings 40 in the resilient disks and contacts with the web of the tire. It is intended that the slight relative movement of the web and plate will be absorbed by the tilting of the spring, but if the movement is excessive or for other reasons it is deemed desirable, then a slide block may be inserted to press against the tire web.

The resilient disks 42, which in the instance shown are of rubber, although they may be formed of other material having the proper characteristics, are formed with the outer edge 44 and the inner edge 46 of slightly greater thickness than the intermediate portion 48. The inner edge of the disk is provided with a central projection 50 having an edge 52, thereby providing an opening of exactly the same size as the offset 16 on the hub portion, thereby properly positioning the disks and at the same time providing space into which the rubber may move when stressed. The increased thickness of the disks is necessary in order that the entire disk may be uniformly loaded under the compression exerted by the clamping bolts, for without this increased thickness the rubber tends to flow away and the edges would be less heavily stressed than the inner portions.

The wheel is assembled by placing the resilient disks on the hub portion and then placing these units on either side of the web and securely clamping the entire assembly by the bolts. In practice an initial high compression of several thousand pounds is placed on the rubber by the bolts, which bolts will be relieved slightly of their strain when the wheel is pressed on the axle in the usual manner. It is seen that the tire is firmly gripped by the rubber elements without vulcanizing and that any shocks on the tire are absorbed by the rubber acting in shear rather than in compression as is customary, and also that due to the slight clearance between the web and offset that the extent of this movement is limited even if the rubber should fail.

Although only one form of wheel and resilient disk has been described, it is obvious that other modifications and arrangement of parts are possible of construction by one skilled in the art and without departing from the scope of the appended claims.

What is claimed is:

1. In a car wheel, a tire portion having an inwardly extending web; a pair of substantially identical apertured hub members disposed in abutting axial alignment, each of said hub members having an outwardly extending flange provided thereon in spaced substantially parallel relationship to said web, securing means extending through said hub members; pre-formed resilient means having thickened edge portions and adapted to encircle the hub portion and to substantially fill the space between the web and respective flange and be compressed under the action of said securing means, said resilient means being formed at its inner edge with a projection or reduced area to provide a limited space in order to permit relative radial movement of the tire and hub; renewable electrical conductor means comprising a plug having threaded engagement with said flange; a conducting member extending through an opening in the resilient means and interposed between said plug and web, said conducting member being so formed and related to the web as to permit said radial movement.

2. In a car wheel, a tire portion having an inwardly extending web; a pair of substantially identical apertured hub members disposed in abutting axial alignment, each of said hub members having an outwardly extending flange provided thereon in spaced substantially parallel relationship to said web, securing means extending through said hub members; pre-formed resilient means adapted to encircle the hub portion and to substantially fill the space between the web and respective flange, said resilient means having the edges thereof thickened with respect to the intermediate portion in order that the initial and maximum pressure upon the same will be exerted adjacent the edge portions under the action of the securing means.

ELMER LATSHAW.